United States Patent
Riley et al.

(10) Patent No.: US 9,166,803 B2
(45) Date of Patent: Oct. 20, 2015

(54) METHODS, SYSTEMS, AND COMPUTER READABLE MEDIA FOR SERVICE DETECTION OVER AN RX INTERFACE

(75) Inventors: Yusun Kim Riley, Weston, MA (US); Uri Baniel, Buffalo Grove, IL (US); Peter J. Marsico, Chapel Hill, NC (US)

(73) Assignee: Tekelec, Inc., Morrisville, NC (US)

( * ) Notice: Subject to any disclaimer, the term of this patent is extended or adjusted under 35 U.S.C. 154(b) by 1089 days.

(21) Appl. No.: 13/024,967

(22) Filed: Feb. 10, 2011

(65) Prior Publication Data
US 2011/0202653 A1 Aug. 18, 2011

Related U.S. Application Data

(60) Provisional application No. 61/303,968, filed on Feb. 12, 2010.

(51) Int. Cl.
| | |
|---|---|
| *G06F 15/173* | (2006.01) |
| *H04L 12/14* | (2006.01) |
| *H04L 12/24* | (2006.01) |
| *H04L 12/26* | (2006.01) |
| *H04L 29/06* | (2006.01) |

(52) U.S. Cl.
CPC ............ *H04L 12/1403* (2013.01); *H04L 12/14* (2013.01); *H04L 41/5058* (2013.01); *H04L 43/028* (2013.01); *H04L 43/18* (2013.01); *H04L 65/1016* (2013.01)

(58) Field of Classification Search
CPC .................. H04L 65/1016; H04L 41/5058
USPC ......................................................... 709/224
See application file for complete search history.

(56) References Cited

U.S. PATENT DOCUMENTS

| | | |
|---|---|---|
| 6,141,686 A | 10/2000 | Jackowski et al. |
| 6,651,101 B1 | 11/2003 | Gai et al. |
| 6,661,780 B2 | 12/2003 | Li |
| 6,880,005 B1 | 4/2005 | Bell et al. |
| 7,209,962 B2 | 4/2007 | Boden |
| 7,289,498 B2 | 10/2007 | Yu et al. |
| 7,581,249 B2 | 8/2009 | Bussiere et al. |

(Continued)

FOREIGN PATENT DOCUMENTS

| | | |
|---|---|---|
| CN | 1849787 A | 10/2006 |
| CN | 101589634 A | 11/2009 |

(Continued)

OTHER PUBLICATIONS

Final Office Action for U.S. Appl. No. 12/973,186 (May 22, 2013).

(Continued)

*Primary Examiner* — Kevin Bates
*Assistant Examiner* — Nazia Naoreen
(74) *Attorney, Agent, or Firm* — Jenkins, Wilson, Taylor & Hunt, P.A.

(57) ABSTRACT

According to one aspect, the subject matter described herein includes a method for communicating service data flow (SDF) event information. The method includes steps occurring at a policy and charging rules function (PCRF) node. The method also includes communicating, via an Rx interface, a request to a deep packet inspection (DPI) node to be notified when an SDF event occurs. The method further includes receiving notification from the DPI node that the SDF event has occurred.

30 Claims, 7 Drawing Sheets

(56) References Cited

U.S. PATENT DOCUMENTS

| | | | |
|---|---|---|---|
| 7,719,966 B2 | 5/2010 | Luft et al. | |
| 7,940,683 B2 | 5/2011 | Dolganow et al. | |
| 8,005,087 B2* | 8/2011 | Dolganow et al. | 370/392 |
| 8,042,148 B2 | 10/2011 | Andreasen et al. | |
| 8,131,831 B1 | 3/2012 | Hu | |
| 8,146,133 B2 | 3/2012 | Moon et al. | |
| 8,159,941 B2 | 4/2012 | Dolganow et al. | |
| 8,250,646 B2 | 8/2012 | Zheng | |
| 8,429,268 B2 | 4/2013 | Riley et al. | |
| 8,433,794 B2 | 4/2013 | Baniel et al. | |
| 8,458,767 B2 | 6/2013 | Riley et al. | |
| 8,467,291 B2* | 6/2013 | Lovesen et al. | 370/230 |
| 8,595,368 B2* | 11/2013 | Baniel et al. | 709/228 |
| 8,640,188 B2 | 1/2014 | Riley et al. | |
| 8,718,075 B2* | 5/2014 | Cai et al. | 370/401 |
| 8,813,168 B2 | 8/2014 | Riley et al. | |
| 2002/0052806 A1 | 5/2002 | Hodson et al. | |
| 2002/0143914 A1 | 10/2002 | Cihula | |
| 2002/0188562 A1 | 12/2002 | Igarashi et al. | |
| 2003/0208523 A1 | 11/2003 | Gopalan et al. | |
| 2004/0111519 A1 | 6/2004 | Fu et al. | |
| 2005/0088977 A1 | 4/2005 | Roch et al. | |
| 2005/0122945 A1 | 6/2005 | Hurtta | |
| 2006/0013191 A1 | 1/2006 | Kavanagh | |
| 2006/0233101 A1 | 10/2006 | Luft et al. | |
| 2007/0004393 A1 | 1/2007 | Forsberg et al. | |
| 2007/0066286 A1 | 3/2007 | Hurtta | |
| 2007/0121812 A1 | 5/2007 | Strange et al. | |
| 2007/0159976 A1 | 7/2007 | Dekeyzer et al. | |
| 2007/0220251 A1 | 9/2007 | Rosenberg et al. | |
| 2007/0226775 A1 | 9/2007 | Andreasen et al. | |
| 2007/0242692 A1 | 10/2007 | Limb et al. | |
| 2007/0286117 A1 | 12/2007 | Balasubramanian et al. | |
| 2008/0046963 A1 | 2/2008 | Grayson et al. | |
| 2008/0076388 A1 | 3/2008 | Nochimowski et al. | |
| 2008/0120700 A1 | 5/2008 | Pandey et al. | |
| 2008/0137541 A1 | 6/2008 | Agarwal et al. | |
| 2008/0201772 A1 | 8/2008 | Mondaeev et al. | |
| 2008/0232376 A1 | 9/2008 | Huang et al. | |
| 2008/0263631 A1 | 10/2008 | Wang et al. | |
| 2008/0276305 A1 | 11/2008 | Chan et al. | |
| 2008/0313708 A1 | 12/2008 | Khan et al. | |
| 2008/0316971 A1 | 12/2008 | Shaheen | |
| 2009/0089418 A1 | 4/2009 | Saha et al. | |
| 2009/0141625 A1 | 6/2009 | Ghai et al. | |
| 2009/0177650 A1 | 7/2009 | Petersson et al. | |
| 2009/0196225 A1 | 8/2009 | Avila Gonzalez et al. | |
| 2009/0222538 A1 | 9/2009 | Takahashi et al. | |
| 2009/0227231 A1 | 9/2009 | Hu et al. | |
| 2009/0228956 A1 | 9/2009 | He et al. | |
| 2009/0282225 A1 | 11/2009 | Caprioli et al. | |
| 2009/0285225 A1 | 11/2009 | Dahod | |
| 2009/0307028 A1 | 12/2009 | Eldon et al. | |
| 2009/0323536 A1 | 12/2009 | Liu et al. | |
| 2010/0040047 A1 | 2/2010 | Zamora et al. | |
| 2010/0121960 A1 | 5/2010 | Baniel et al. | |
| 2010/0142373 A1 | 6/2010 | Jin et al. | |
| 2010/0185488 A1 | 7/2010 | Hogan et al. | |
| 2010/0217877 A1* | 8/2010 | Willars et al. | 709/228 |
| 2010/0235877 A1 | 9/2010 | Hu et al. | |
| 2011/0022702 A1 | 1/2011 | Riley et al. | |
| 2011/0022722 A1 | 1/2011 | Castellanos Zamora et al. | |
| 2011/0041182 A1 | 2/2011 | Stenfelt | |
| 2011/0111767 A1 | 5/2011 | Livanos | |
| 2011/0167471 A1 | 7/2011 | Riley et al. | |
| 2011/0170412 A1 | 7/2011 | Ramadas et al. | |
| 2011/0219426 A1 | 9/2011 | Kim et al. | |
| 2011/0225280 A1 | 9/2011 | Delsesto et al. | |
| 2011/0225306 A1 | 9/2011 | Delsesto et al. | |
| 2011/0225309 A1 | 9/2011 | Riley et al. | |
| 2011/0246586 A1* | 10/2011 | Steele | 709/206 |
| 2011/0296489 A1 | 12/2011 | Fernandez Alonso et al. | |
| 2012/0084425 A1 | 4/2012 | Riley et al. | |
| 2012/0131165 A1 | 5/2012 | Baniel et al. | |
| 2012/0144049 A1* | 6/2012 | Lopez Nieto et al. | 709/228 |

FOREIGN PATENT DOCUMENTS

| | | |
|---|---|---|
| EP | 1 501 242 A2 | 1/2005 |
| EP | 1 551 144 A1 | 7/2005 |
| EP | 2 045 974 A1 | 4/2009 |
| KR | 10-2006-0028042 | 3/2006 |
| KR | 10-2009-0027861 | 3/2009 |
| WO | WO 2007/092573 A2 | 8/2007 |
| WO | WO 2008/000287 A1 | 1/2008 |
| WO | WO 2008/114217 A1 | 9/2008 |
| WO | WO 2008/131689 A1 | 11/2008 |
| WO | WO 2009/149341 A2 | 12/2009 |
| WO | WO 2010/086013 | 8/2010 |
| WO | WO 2011/011790 A2 | 1/2011 |
| WO | WO 2011/082036 A2 | 7/2011 |
| WO | WO 2011/109821 A2 | 9/2011 |
| WO | WO 2011/115991 A2 | 9/2011 |

OTHER PUBLICATIONS

Non-Final Office Action for U.S. Appl. No. 13/048,607 (Mar. 4, 2013).

Non-Final Office Action for U.S. Appl. No. 13/048,629 (Feb. 15, 2013).

Final Office Action for U.S. Appl. No. 12/479,179 (Feb. 15, 2013).

Non-Final Office Action for U.S. Appl. No. 13/048,597 (Feb. 1, 2013).

Notice of Allowance and Fee(s) Due for U.S. Appl. No. 13/042,294 (Jan. 30, 2013).

Communication of European Publication Number and Information on the Application of Article 67(3) EPC for European Patent Application No. 11756855.0 (Jan. 4, 2013).

Notice of Allowance and Fee(s) Due for U.S. Appl. No. 12/621,190 (Dec. 27, 2012).

Communication of European Publication Number and Information on the Application of Article 67(3) EPC for European Patent Application No. 11751508.0 (Dec. 12, 2012).

Communication of European publication number and information on the application of Article 67(3) EPC for European Application No. 11742958.9 (Nov. 21, 2012).

3GPP, "Policy and Charging Control Over Rx Reference Point," 3GPP ETSI TS 29.214 version 8.3.0 Release 8 (Feb. 2009).

Notice of Allowance and Fee(s) Due for U.S. Appl. No. 13/225,390 (Oct. 9, 2012).

Non-Final Official Action for U.S. Appl. No. 12/479,179 (Sep. 13, 2012).

European Search Report for European Patent Application No. EP 09 75 9499 (Sep. 12, 2012).

Non-Final Official Action for U.S. Appl. No. 12/973,186 (Aug. 24, 2012).

Applicant-Initiated Interview Summary for U.S. Appl. No. 13/225,390 (Aug. 13, 2012).

Non-Final Official Action for U.S. Appl. No. 13/042,294 (Jun. 20, 2012).

Notice of Allowance and Fee(s) Due for U.S. Appl. No. 12/621,190 (May 29, 2012).

Non-Final Official Action for U.S. Appl. No. 13/225,390 (May 14, 2012).

Communication of European publication number and information on the application of Article 67(3) EPC for European Application No. 10803020.6 (May 4, 2012).

Final Official Action for U.S. Appl. No. 12/479,179 (Apr. 10, 2012).

3rd Generation Partnership Project, "Technical Specification Group Core Network and Terminals; Policy and Charging Control over Gx Reference Point," 3GPP TS 29.212, V8.0.0, Release 8 (May 2008).

Applicant-Initiated Interview Summary for U.S. Appl. No. 12/621,190 (Feb. 7, 2012).

Notification of Transmittal of the International Search Report and the Written Opinion of the International Searching Authority, or the Declaration for International Application No. PCT/US2011/027427 (Nov. 15, 2011).

Notification of Transmittal of the International Search Report and the Written Opinion of the International Searching Authority, or the Declaration for International Application No. PCT/US2011/028520 (Oct. 31, 2011).

(56) References Cited

OTHER PUBLICATIONS

Notification of Transmittal of the International Search Report and the Written Opinion of the International Searching Authority, or the Declaration for International Application No. PCT/US2011/024753 (Oct. 28, 2011).
Notification of Transmittal of the International Search Report and the Written Opinion of the International Searching Authority, or the Declaration for International Patent Application No. PCT/US2010/061589 (Sep. 26, 2011).
Commonly-assigned, co-pending U.S. Appl. No. 13/225,390 for "Method and System for Providing Mobility Management in Network", (Unpublished, filed on Sep. 2, 2011).
Non-Final Official Action for U.S. Appl. No. 12/621,190 (Aug. 3, 2011).
Non-Final Official Action for U.S. Appl. No. 12/479,179 (Aug. 2, 2011).
Commonly-assigned, co-pending U.S. Appl. No. 13/157,052 for "Methods, Systems, and Computer Readable Media for Providing Nested Policy Configuration in a Communications Network", (Unpublished, filed on Jun. 9, 2011).
Notification of Transmittal of the International Search Report and the Written Opinion of the International Searching Authority, or the Declaration for International Application No. PCT/US2010/043258 (Feb. 28, 2011).
Restriction Requirement for U.S. Appl. No. 12/479,179 (Feb. 8, 2011).
"3rd Generation Partnership Project; Technical Specification Group Core Network and Terminals; Policy and Charging Control over Rx reference point (Release 9)," 3GPP TS 29.214, V9.3.0, pp. 1-45 (Mar. 2010).
"Universal Mobile Telecommunications System (UMTS); LTE; Policy and charging control over Rx reference point (3GPP TS 29.214 version 9.2.0 Release 9)," ETSI TS 129 214, V9.2.0 (Jan. 2010).
"Universal Mobile Telecommunications System (UMTS); LTE; Policy and charging control over Gx reference point (3GPP TS 29.212 version 9.1.0 Release 9)," ETSI TS 129 212, V9.1.0 (Jan. 2010).
Notification of Transmittal of the International Search Report and the Written Opinion of the International Searching Authority, or the Declaration for International Application No. PCT/US2009/046395 (Dec. 28, 2009).
3rd Generation Partnership Project, Technical Specification Group Core Network and Terminals; Policy and Charging Control Over Gx reference point (Release 9), 3GPP TS 29.212, V9.1.0, pp. 1-106 (Dec. 2009).
"Chapter 1: Overview of GPRS and UMTS," Cisco GGSN release 9.0 Configuration Guide, Cisco IOS Release 12.4(22)YE, pp. 1-1—1-16 (Aug. 4, 2009).
"Introduction to Diameter," Wikipedia, pp. 1-12 (Downloaded from the Internet on May 15, 2009).
"Diameter Credit-Control Application," Wikipedia, pp. 1-7 (Downloaded from the Internet on May 13, 2009).
"Diameter (Protocol)," Wikipedia, pp. 1-8 (Downloaded from the Internet on May 13, 2009).
"File: GPRS Core Structure.phg," Wikipedia, pp. 1-3 (Downloaded from the Internet on May 13, 2009).
"GPRS Core Network," Wikipedia, pp. 1-6 (Downloaded from the Internet on May 13, 2009).
"GPRS Network Architecture," DenMasBroto, pp. 1-2 (Downloaded from the Internet on May 13, 2009) (May 28, 2008).
Agilent Technologies, "Understanding DSLAM and BRAS Access Devices," White Paper, pp. 1-15 (2006).
Hakala et al., "Diameter Credit-Control Application," Network Working Group RFC 4006, pp. 1-114 (Aug. 2005).
Zhou et al., "Prophet Address Allocation for Large Scale MANETs," Ad Hoc Networks, vol. 1, Issue 4, pp. 423-434 (Nov. 2003).
Calhoun et al., "Diameter Base Protocol," RFC 3588, pp. 1-147 (Sep. 2003).
Ponnappan et al., "A Policy Based QoS Management System for the IntServ/DiffServ Based Internet," Policies for Distributed Systems and Networks, pp. 159-168 (2002).
"GPRS Tutorial," MorganDoyle Limited, pp. 1-13 (Publication Date Unknown).
Final Office Action for U.S. Appl. No. 13/048,607 (Oct. 25, 2013).
Notice of Allowance and Fee(s) Due for U.S. Appl. No. 12/973,186 (Sep. 19, 2013).
Advisory Action Before the Filing of an Appeal Brief for U.S. Appl. No. 13/048,597 (Sep. 13, 2013).
Communication Under Rule 71(3) EPC for European Patent Application No. 09759499.8 (Aug. 14, 2013).
Notice of Allowance and Fee(s) Due for U.S. Appl. No. 12/479,179 (Jul. 9, 2013).
Interview Summary for U.S. Appl. No. 12/479,179 (Jul. 1, 2013).
Final Office Action for U.S. Appl. No. 13/048,597 (Jun. 21, 2013).
Non-Final Office Action for U.S. Appl. No. 13/157,052 (Jun. 6, 2013).
First Office Action for Chinese Patent Application No. 200980130515.0 (Apr. 24, 2013).
Communication of extended European Search Report for European Patent Application No. 10841576.1 (May 9, 2014).
Notice of Allowance and Fee(s) Due for U.S. Appl. No. 13/157,052 (Apr. 14, 2014).
Applicant-Initiated Interview Summary and Advisory Action Before the Filing of an Appeal Brief for U.S. Appl. No. 13/157,052 (Mar. 17, 2014).
Decision to grant a European patent pursuant to Article 97(1) EPC for European Application No. 09759499.8 (Jan. 23, 2014).
Advisory Action Before the Filing of an Appeal Brief for U.S. Appl. No. 13/048,629 (Jan. 9, 2014).
Advisory Action Before the Filing of an Appeal Brief for U.S. Appl. No. 13/048,607 (Jan. 7, 2014).
Final Office Action for U.S. Appl. No. 13/157,052 (Jan. 2, 2014).
Second Office Action for Chinese Application No. 200980130515.0 (Dec. 10, 2013).
Final Office Action for U.S. Appl. No. 13/048,629 (Nov. 8, 2013).
Letter Regarding Decision to grant a Chinese patent for Chinese Application No. ZL201180017408.4 (Dec. 2, 2014).
Letter Regarding Decision to grant a Chinese patent for Chinese Application No. ZL200980130515.0 (Dec. 2, 2014).
Advisory Action for U.S. Appl. No. 13/048,597 (Dec. 18, 2014).
Non-Final Office Action for U.S. Appl. No. 13/048,629 (Oct. 8, 2014).
Non-Final Office Action for U.S. Appl. No. 13/048,607 (Oct. 7, 2014).
Final Office Action for U.S. Appl. No. 13/048,597 (Oct. 6, 2014).
Notification of the First Office Action for Chinese Application No. 201180024178.4 (Sep. 25, 2014).
Notification of the Third Office Action for Chinese Application No. 200980130515.0 (Jun. 26, 2014).
Non-Final Office Action for U.S. Appl. No. 13/048,597 (Jun. 24, 2014).
Notification of the First Office Action for Chinese Application No. 201180013382.6 (Jun. 20, 2014).
Notification of the First Office Action for Chinese Application No. 201180017408.4 (Jun. 3, 2014).
Communication of European publication number and information on the application of Article 67(3) EPC for European Application No. 09759499.8 (Feb. 2, 2011).

* cited by examiner

METHODS, SYSTEMS, AND COMPUTER READABLE MEDIA FOR SERVICE DETECTION OVER AN RX INTERFACE

PRIORITY CLAIM

This application claims the benefit of U.S. Provisional Patent Application Ser. No. 61/303,968, filed Feb. 12, 2010; the disclosure of which is incorporated herein by reference in its entirety.

TECHNICAL FIELD

The subject matter described herein relates to service detection over an Rx interface. More specifically, the subject matter relates to methods, systems, and computer readable media for service detection over an Rx interface.

BACKGROUND

A policy and charging rules function (PCRF) node may be utilized by multimedia networks to determine policy rules in real-time. Utilization of a PCRF may aid a network operator in making real-time, subscriber specific, policy decisions that may be utilized to provide varying levels of quality of service (QoS). As a central policy decision point for a network, a PCRF node may benefit from information provided by other nodes.

Deep packet inspection (DPI) is the use of a packet's non-header information by a network entity that is not an endpoint for that packet. DPI is employed by network operators for a wide variety of uses, e.g., anti-virus, spam filtering, intrusion detection, and gathering statistical information. A DPI node is a network node having DPI capability.

Based on operator policy, a PCRF node may need to be informed by a DPI node when a particular traffic for a user is encountered. Once informed by the DPI node that the specified traffic for the user has been encountered, the PCRF node may take appropriate action.

Accordingly, a need exists for methods, systems, and computer readable media for service detection over an Rx interface.

SUMMARY

According to one aspect, the subject matter described herein includes a method for communicating service data flow (SDF) event information. The method includes steps occurring at a PCRF node. The method also includes communicating, via an Rx interface, a request to a DPI node to be notified when an SDF event occurs. The method further includes receiving notification from the DPI node that the SDF event has occurred.

According to another aspect, the subject matter described herein includes a method for communicating SDF event information. The method includes communicating, by a PCRF node and to a DPI node, a request that an application function (AF) node be notified when an SDF event occurs, wherein the communication is accomplished via an Rx interface. The method also includes in response to detecting the SDF event at the DPI node, sending, by the DPI node and to the AF node, notification that the SDF event has occurred. The method further includes receiving, at the AF node and from the DPI node, the notification that the SDF event has occurred.

According to another aspect, the subject matter described herein includes a system for communicating SDF event information. The system includes a PCRF node and a DPI node. The PCRF node is configured to: communicate, via an Rx interface, a request to the DPI node to be notified when an SDF event occurs; and receive notification from the DPI node that the SDF event has occurred.

According to another aspect, the subject matter described herein includes a system for communicating SDF event information. The system includes a PCRF node configured to communicate, via an Rx interface, a request that an AF node be notified of an SDF event. The system further includes a DPI node configured to receive the request from the PCRF node via the Rx interface and to, in response to detecting the SDF event, send to the AF node notification that the SDF event has occurred.

As used herein, the term "node" refers to a physical computing platform including one or more processors and memory.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
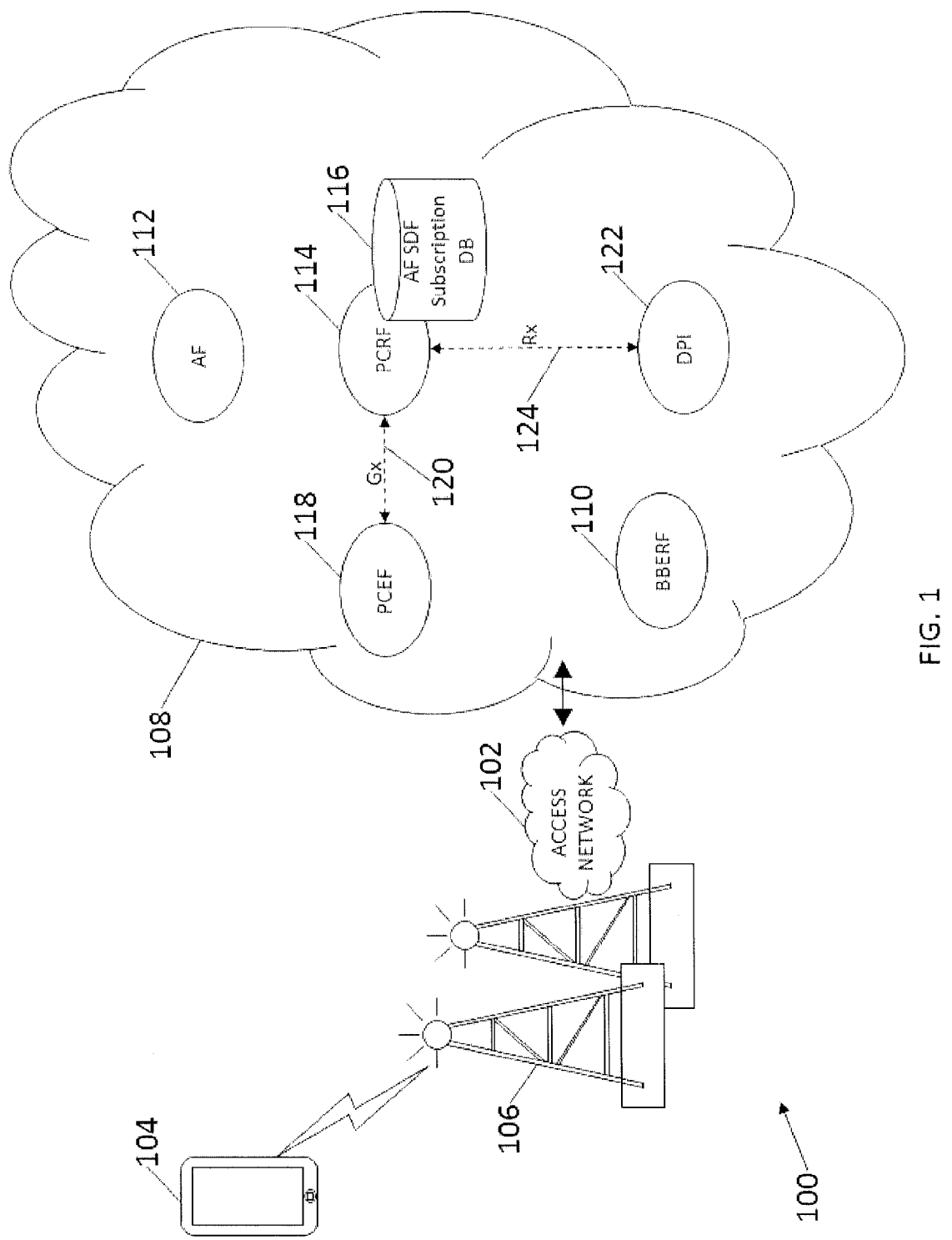
FIG. 1 is a network diagram illustrating an exemplary network environment for communicating SDF event information according to an embodiment of the subject matter described herein.

Methods, systems, and computer readable media for communicating SDF event information are provided. FIG. 1 is a network diagram illustrating an exemplary network environment for communicating SDF event information according to an embodiment of the subject matter described herein. Referring to FIG. 1, network environment 100 may include access network 102. Access network 102 may include nodes, functions, devices, and/or components for providing user equipment (UE) 104 access to services, functions, or devices in one or more networks. In one embodiment, access network 102 may be a radio access network (RAN). For example, access network 102 may be a global system for mobile communications (GSM) RAN (GRAN), a general packet radio service (GPRS) access network, a universal mobile telecommunications system (UMTS) RAN (UTRAN), an evolved UTRAN (eUTRAN), an Internet protocol (IP) connectivity access network (IPCAN), a code division multiple access (CDMA) network, an evolution-data optimized (EV-DO) network, a wideband CDMA (WCDMA) network, a high speed packet access (HPSA) network, an evolved HPSA (EHPSA+) network, or a long term evolution (LTE) access network. Access network 102 may include one or more transceiver nodes 106 for communicating with UE 104. UE 104 may include a computer, a pager, a mobile phone, a smartphone, a wireless modem, or other devices through which a subscriber accesses network services.

Network environment 100 may further include a carrier network 108. Carrier network 108 may include a bearer binding and event reporting function (BBERF) node 110. BBERF node 110 may be, for example, a service gateway (SGW) or a serving general packet radio service (GPRS) support node (SGSN). Carrier network 108 may further include an AF node 112. AF node 112 may be, for example, an application server (AS), a multimedia resource function (MRF), or a proxy call session control function (P-CSCF).

Carrier network 108 may also include a PCRF node 114. PCRF node 114 is a centralized node that can act as a policy decision point for carrier network 108. PCRF node 114 may take operator defined service policies, subscription information pertaining to a user, and other data into account to build policy decisions. Policy decisions may be formulated as policy control and charging (PCC) rules. PCC rules may contain information about user plane traffic expressed as a packet filter. A packet filter make take the form of an IP five-tuple specifying: (1) source IP address(es), (2) destination IP address(es), (3) source port number(s), (4) destination port number(s), and (5) application protocol(s) (e.g., transmission control protocol (TCP), user datagram protocol (UDP)). All IP packets matching a packet filter of a PCC rule may be designated an SDF.

Flow-based charging models may introduce the ability to charge for SDFs identified by service data flow filters according to specified charging rules. Charging rules may contain information that allows the filtering of traffic to identify packets belonging to a particular SDF (e.g., IP multimedia subsystem (IMS), file transfer protocol (FTP), browsing) and allow an operator to define how a particular SDF is to be charged (e.g., different media streams within a single packet data protocol (PDP) context.) Charging rules may be requested by a policy and charging enforcement function (PCEF) node (e.g., by a packet data network (PDN) gateway in an evolved packet system (EPS)), at bearer establishment, upon a specified trigger event, and/or upon bearer termination. Such a request may be made using a Gx reference point towards a PCRF.

In one embodiment, PCRF node 114 may have and/or access an AF SDF subscription database (DB) 116. In accordance with an embodiment of the subject matter described herein, AF SDF subscription DB 116 may store AF subscription requests pertaining to a particular SDF event. AF subscription requests may be made by an AF node, such as AF node 112, and stored dynamically in AF SDF subscription DB 116 and/or AF subscription requests may be statically/pre-provisioned in AF SDF subscription DB 116.

Carrier network 108 may also include PCEF node 118. PCEF node 118 may serve as a policy enforcement point and may be placed in line between access network 102 and PCRF node 114. PCEF node 118 may be, for example, a gateway GPRS support node (GGSN) or a PDN gateway. As an enforcement point, PCEF node 118 may request and receive policy rules from PCRF node 114. PCEF node 118 may receive policy rules from PCRF node 114 via, for example, Gx interface 120. Policy rules may take the form of, for example, Gx rules contained in credit control messages.

Carrier network 108 may further include DPI node 122. DPI node 122 may have the capability to inspect and process a packet's non-header information despite not being an endpoint for that packet. In other embodiments (not illustrated) DPI functionality may be integrated/co-located within a PCEF node. For example, PCEF node 118 could be configured to include DPI capabilities. DPI node 122 may be configured to communicate with PCRF node 114. For example DPI node 122 may be configured to communicate with PCRF node 114, via an Rx interface, such as Rx interface 124. In accordance with an embodiment of the subject matter described herein, PCRF node 114 may utilize Rx interface 124 to communicate SDF event information to DPI node 122.

Figure 2:
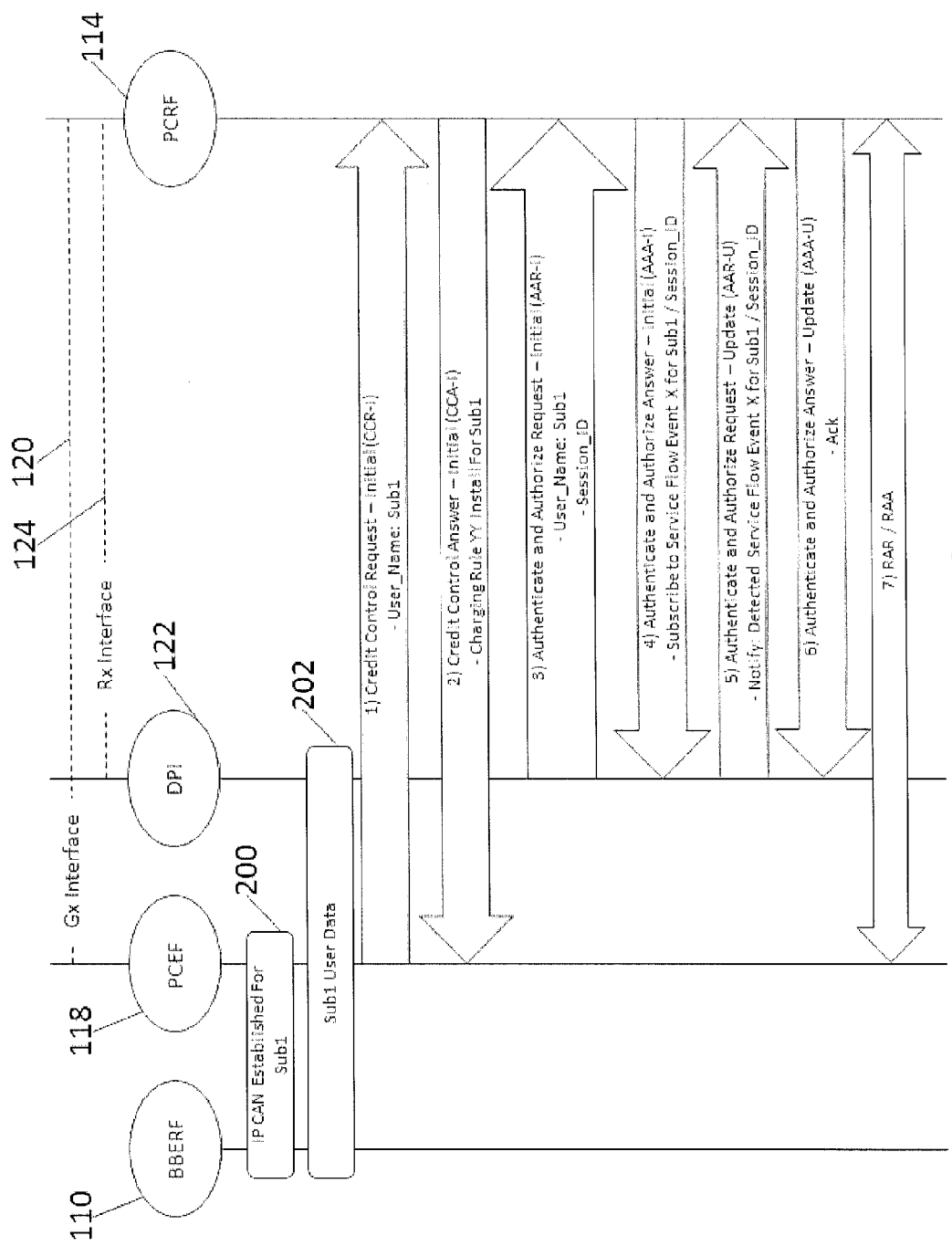
FIG. 2 is a message flow diagram illustrating the communication, of SDF event information where a PCRF node requests, via an Rx interface, a subscription to an SDF event from a DPI node according to an embodiment of the subject matter described herein.

FIG. 2 is a message flow diagram illustrating the communication, of SDF event information where a PCRF node requests, via an Rx interface, a subscription to an SDF event from a DPI node according to an embodiment of the subject matter described herein. Referring to FIG. 2, an IPCAN session 200 may be established for a network subscriber. Signaling and user plane data 202 associated with session 200 may traverse some or all of BBERF node 110, PCEF node 118, DPI node 122, and PCRF node 114. At step 1, PCEF node 118 may notify PCRF node 114 of session 200's establishment. At step 2, PCRF node 114 may provide PCEF node 118 with one or more charging/policy rules. Just prior to step 3, DPI node 122 may detect the initiation of session 200. In response, at step 3, DPI node 122 may contact PCRF node 114.

In accordance with an embodiment of the subject matter described herein, at step 4, PCRF node 114 may return a message, via Rx interface 124, requesting a subscription to an SDF event "X" associated with the subscriber. The request message may be sent, for example, via a Diameter message, an extensible markup language (XML) message, a session initiation protocol (SIP) message (e.g., SIP Notify method message), or a simple object access protocol (SOAP) message.

In an alternate embodiment (not illustrated), PCRF node 114 may initiate contact with DPI node 122 after receiving notification of session 200's establishment from PCEF node 118 at step 1. In such an embodiment, DPI node 122 may not contact PCRF node 114, in the manner illustrated by step 3.

Returning to FIG. 2, just prior to step 5, DPI node 122 may detect SDF event "X" associated with the subscriber. In response, at step 5, DPI node 122 may send a message to PCRF node 114 notifying PCRF node 114 of the SDF event detection. The notification message may be sent, for example, via Rx interface 124. The notification message may be, for example, a Diameter message, an XML message, a session initiation protocol (SIP) message, or a SOAP message. At step 6, PCRF node 114 may acknowledge the DPI generated message. At step 7, PCRF node 114 may communicate one or more charging/policy rules for the subscriber to PCEF node 118. Communicating one or more charging/policy rules for the subscriber to PCEF node 118 may be accomplished, for example, via Gx interface 120. The one or more charging/policy rules may be sent, for example, via a Diameter message, an XML message, or a SOAP message. If a Diameter message is utilized, the one or more charging/policy rules may be sent, for example, as a credit control answer (CCA) message or a re-authorization-request (RAR) message.

Figure 3:
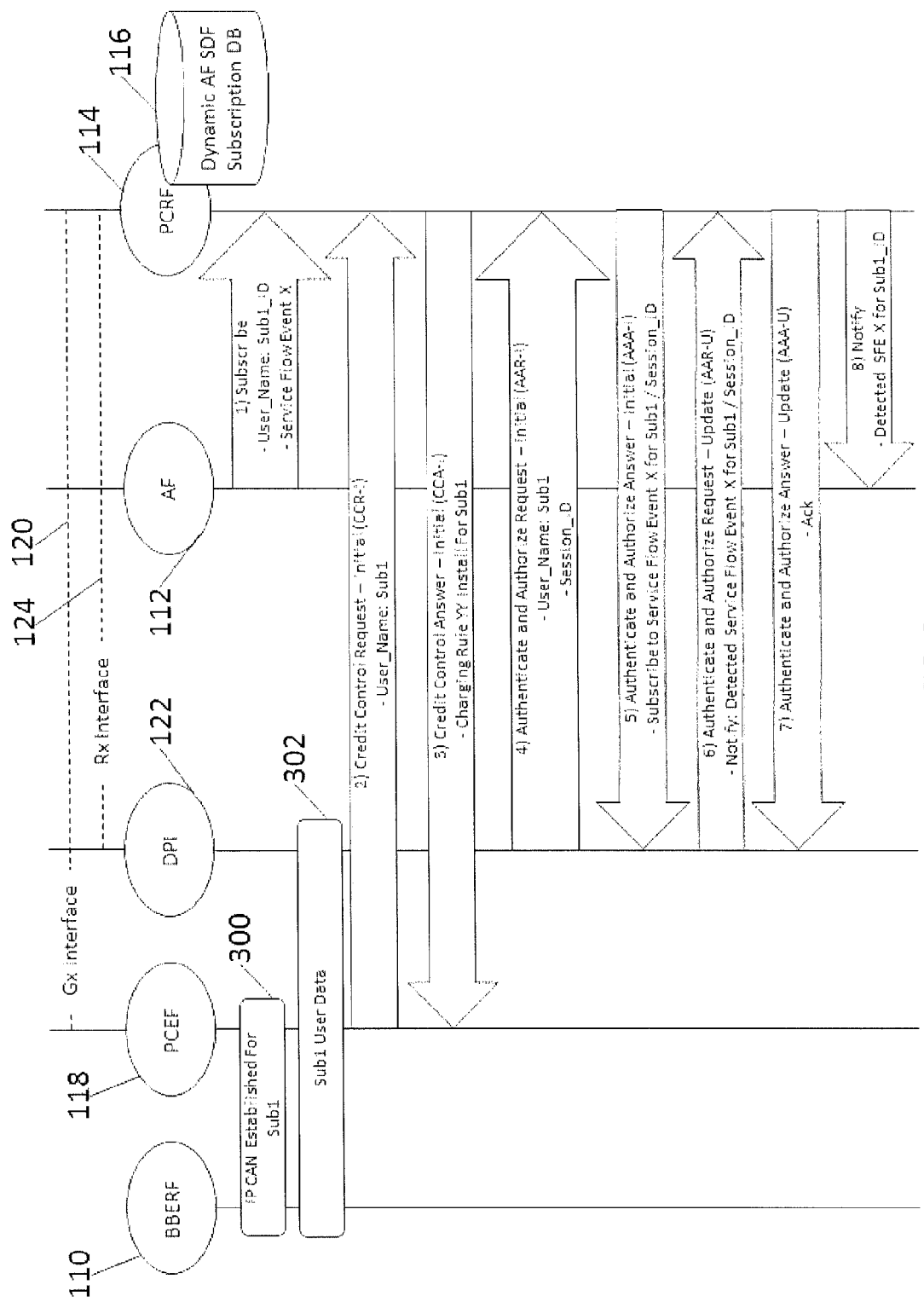
FIG. 3 is a message flow diagram illustrating the communication, of SDF event information where an AF node requests a subscription to an SDF event from a PCRF node and the PCRF node requests, via an Rx interface, a subscription to the SDF event from a DPI node on the AF node's behalf according to an embodiment of the subject matter described herein.

FIG. 3 is a message flow diagram illustrating the communication, of SDF event information where an AF node requests a subscription to an SDF event from a PCRF node and the PCRF node requests, via an Rx interface, a subscription to the SDF event from a DPI node on the AF node's behalf according to an embodiment of the subject matter described herein. Referring to FIG. 3, at step 1, AF node 112 may communicate a message to PCRF node 114 requesting a subscription to an SDF detection event "X" associated with a network subscriber. PCRF node 114 may have and/or access AF SDF subscription DB 116. AF SDF subscription DB 116 may be dynamic and may store AF node 112's subscription request. Prior to step 2, an IPCAN session 300 may be established for the network subscriber. Signaling and user plane data 302 associated with session 300 may traverse some or all of BBERF node 110, PCEF node 118, DPI node 122, and PCRF node 114. At step 2, PCEF node 118 may notify PCRF node 114 of session 300's establishment. At step 3, PCRF node 114 may provide PCEF node 118 with one or more charging/policy rules. Just prior to step 4, DPI node 122 may detect the initiation of session 300. In response, at step 4, DPI node 122 may contact PCRF node 114.

In accordance with an embodiment of the subject matter described herein, at step 5, PCRF node 114 may return a message, via Rx interface 124, requesting a subscription to SDF event "X" associated with the subscriber on behalf of AF node 112. The request message may be sent, for example, via a Diameter message, an XML message, or a SOAP message. Just prior to step 6, DPI node 122 may detect SDF event "X" associated with the subscriber. In response, at step 6, DPI node 122 may send a message to PCRF node 114 notifying PCRF node 114 of the SDF event detection. The notification message may be sent, for example, via Rx interface 124. The notification message may be, for example, a Diameter message, an XML message, or a SOAP message. At step 7, PCRF node 114 may acknowledge the DPI generated message. At step 8, PCRF node 114 may send a message to AF node 112 notifying it of the SDF event "X" detection. The notification message may be sent, for example, via Rx interface 124. The notification message may be, for example, a Diameter message, an XML message, a session initiation protocol (SIP) message, or a SOAP message.

Figure 4:
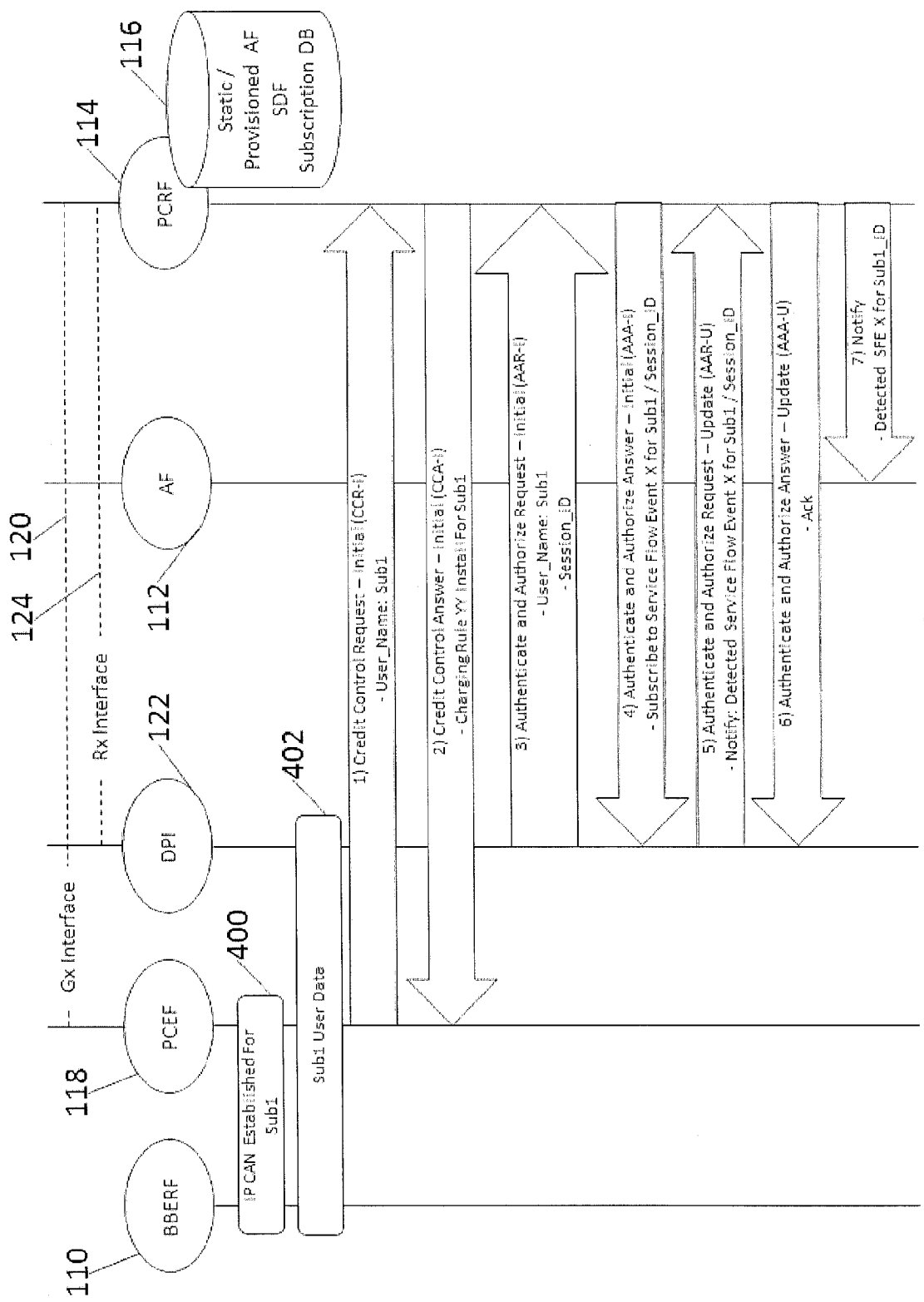
FIG. 4 is a message flow diagram illustrating the communication, of SDF event information where a PCRF node is statically/pre-provisioned with an AF node's subscription to an SDF event and the PCRF node requests, via an Rx interface, a subscription to the SDF event from a DPI node on the AF node's behalf according to an embodiment of the subject matter described herein.

FIG. 4 is a message flow diagram illustrating the communication, of SDF event information where a PCRF node is statically/pre-provisioned with an AF node's subscription to an SDF event and the PCRF node requests, via an Rx interface, a subscription to the SDF event from a DPI node on the AF node's behalf according to an embodiment of the subject matter described herein. Referring to FIG. 4, prior to step 1, PCRF node 114 may be statically/pre-provisioned with a rule that specifies that an SDF event "X" associated with a network subscriber is to be reported to AF node 112. PCRF node 114 may have and/or access AF SDF subscription DB 116. AF SDF subscription DB 116 may store the rule specifying that SDF event "X" associated with the network subscriber is to be reported to AF node 112. Also prior to step 1, an IPCAN session 400 may be established for the network subscriber. Signaling and user plane data 402 associated with session 400 may traverse some or all of BBERF node 110, PCEF node 118, DPI node 122, and PCRF node 114. At step 1, PCEF node 118 may notify PCRF node 114 of session 400's establishment. At step 2, PCRF node 114 may provide PCEF node 118 with one or more charging/policy rules. Just prior to step 3, DPI node 122 may detect the initiation of session 400. In response, at step 3, DPI node 122 may contact PCRF node 114.

In accordance with an embodiment of the subject matter described herein, at step 4, PCRF node 114 may return a message, via Rx interface 124, requesting a subscription to SDF event "X" associated with the subscriber on behalf of AF node 112. The request message may be sent, for example, via a Diameter message, an XML message, a session initiation protocol (SIP) message, or a SOAP message. Just prior to step 5, DPI node 122 may detect SDF event "X" associated with the subscriber. In response, at step 5, DPI node 122 may send a message to PCRF node 114 notifying PCRF node 114 of the SDF event detection. The notification message may be sent, for example, via Rx interface 124. The notification message may be, for example, a Diameter message, an XML message, a session initiation protocol (SIP) message, or a SOAP message. At step 6, PCRF node 114 may acknowledge the DPI generated message. At step 7, PCRF node 114 may send a message to AF node 112 notifying it of the SDF event "X" detection. The notification message may be sent, for example, via Rx interface 124. The notification message may be, for example, a Diameter message, an XML message, a session initiation protocol (SIP) message, or a SOAP message.

Figure 5:
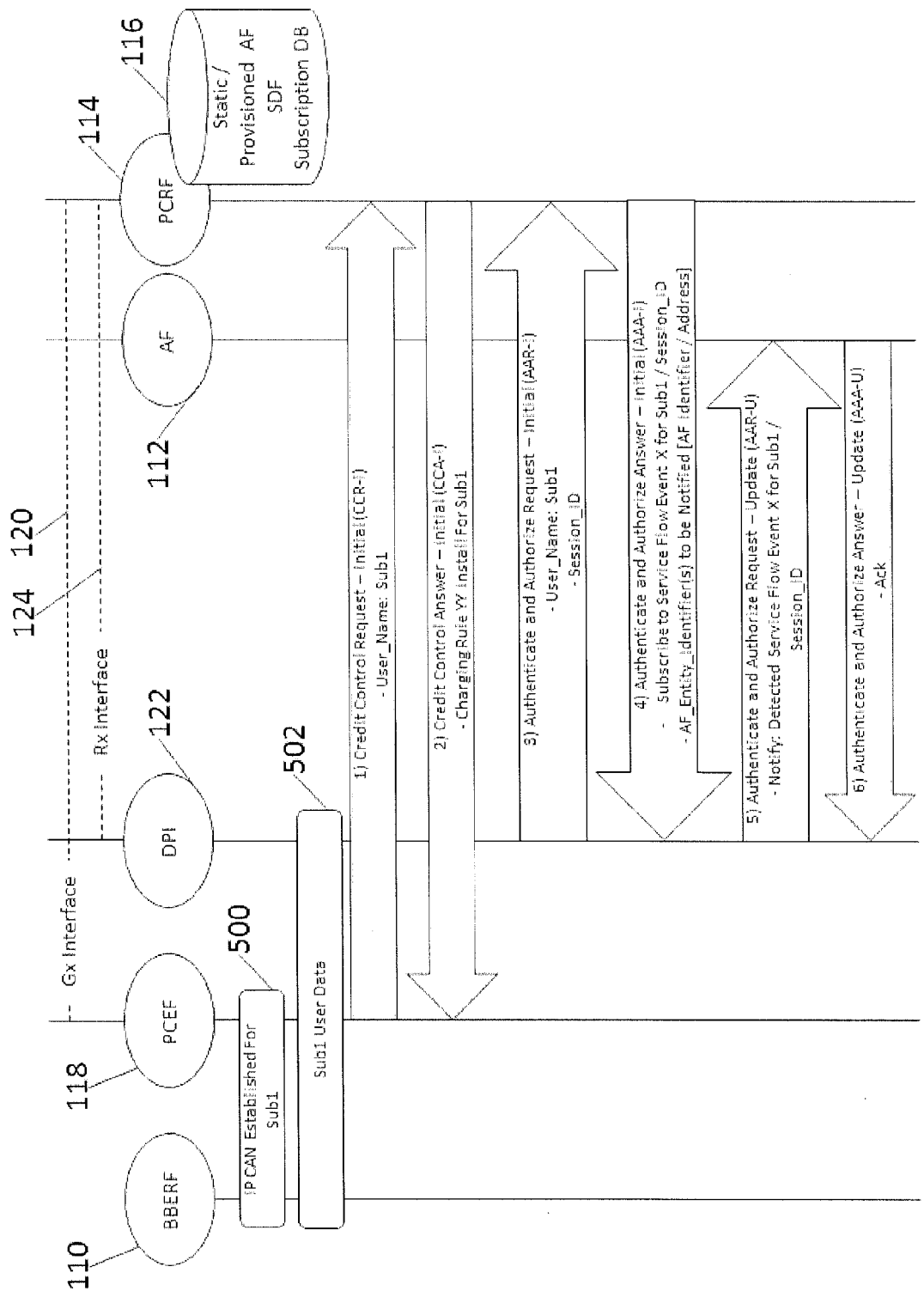
FIG. 5 is a message flow diagram illustrating the communication, of SDF event information where a PCRF node is statically/pre-provisioned with an AF node's subscription to an SDF event, the PCRF node requests, via an Rx interface, a subscription to the SDF event from a DPI node on the AF node's behalf, and the DPI node directly notifies the AF node of the SDF event's detection according to an embodiment of the subject matter described herein.

FIG. 5 is a message flow diagram illustrating the communication, of SDF event information where a PCRF node is statically/pre-provisioned with an AF node's subscription to an SDF event, the PCRF node requests, via an Rx interface, a subscription to the SDF event from a DPI node on the AF node's behalf, and the DPI node directly notifies the AF node of the SDF event's detection according to an embodiment of the subject matter described herein. Referring to FIG. 5, prior to step 1, PCRF node 114 may be statically/pre-provisioned with a rule that specifies that an SDF event "X" associated with a network subscriber is to be reported to AF node 112. PCRF node 114 may have and/or access AF SDF subscription DB 116. AF SDF subscription DB 116 may store the rule specifying that SDF event "X" associated with the network subscriber is to be reported to AF node 112. Also prior to step 1, an IPCAN session 500 may be established for the network subscriber. Signaling and user plane data 502 associated with session 500 may traverse some or all of BBERF node 110, PCEF node 118, DPI node 122, and PCRF node 114. At step 1, PCEF node 118 may notify PCRF node 114 of session 500's establishment. At step 2, PCRF node 114 may provide PCEF node 118 with one or more charging/policy rules. Just prior to step 3, DPI node 122 may detect the initiation of session 500. In response, at step 3, DPI node 122 may contact PCRF node 114.

In accordance with an embodiment of the subject matter described herein, at step 4, PCRF node 114 may return a message, via Rx interface 124, requesting a subscription to SDF event "X" associated with the subscriber on behalf of AF node 112. The request message may contain an identifier and/or address of AF node 112, and may indicate that AF node 112 is to be notified upon detection of SDF event "X" associated with the subscriber. The request message may be sent, for example, via a Diameter message, an XML message, a session initiation protocol (SIP) message, or a SOAP message. Just prior to step 5, DPI node 122 may detect SDF event "X" associated with the subscriber. In response, at step 5, DPI node 122 may send a message to AF node 112 notifying AF node 112 of the SDF event detection. The notification message may be sent, for example, via Rx interface 124. The notification message may be, for example, a Diameter message, an XML message, a session initiation protocol (SIP) message, or a SOAP message. At step 6, AF node 112 may acknowledge the DPI generated message.

Figure 6:
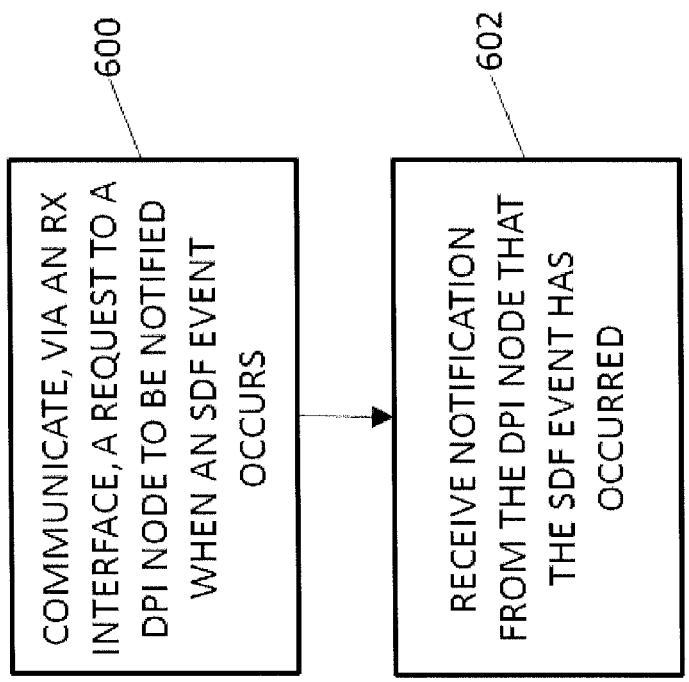
FIG. 6 is a flow chart illustrating an exemplary process for communicating SDF event information according to an embodiment of the subject matter described herein.

FIG. 6 is a flow chart illustrating an exemplary process for communicating SDF event information according to an embodiment of the subject matter described herein. Referring to FIG. 6, in step 600, a PCRF node communicates, via an Rx interface, a request to a DPI node to be notified when an SDF event occurs. In step 702, the PCRF node receives notification from the DPI node that the SDF event has occurred.

Figure 7:
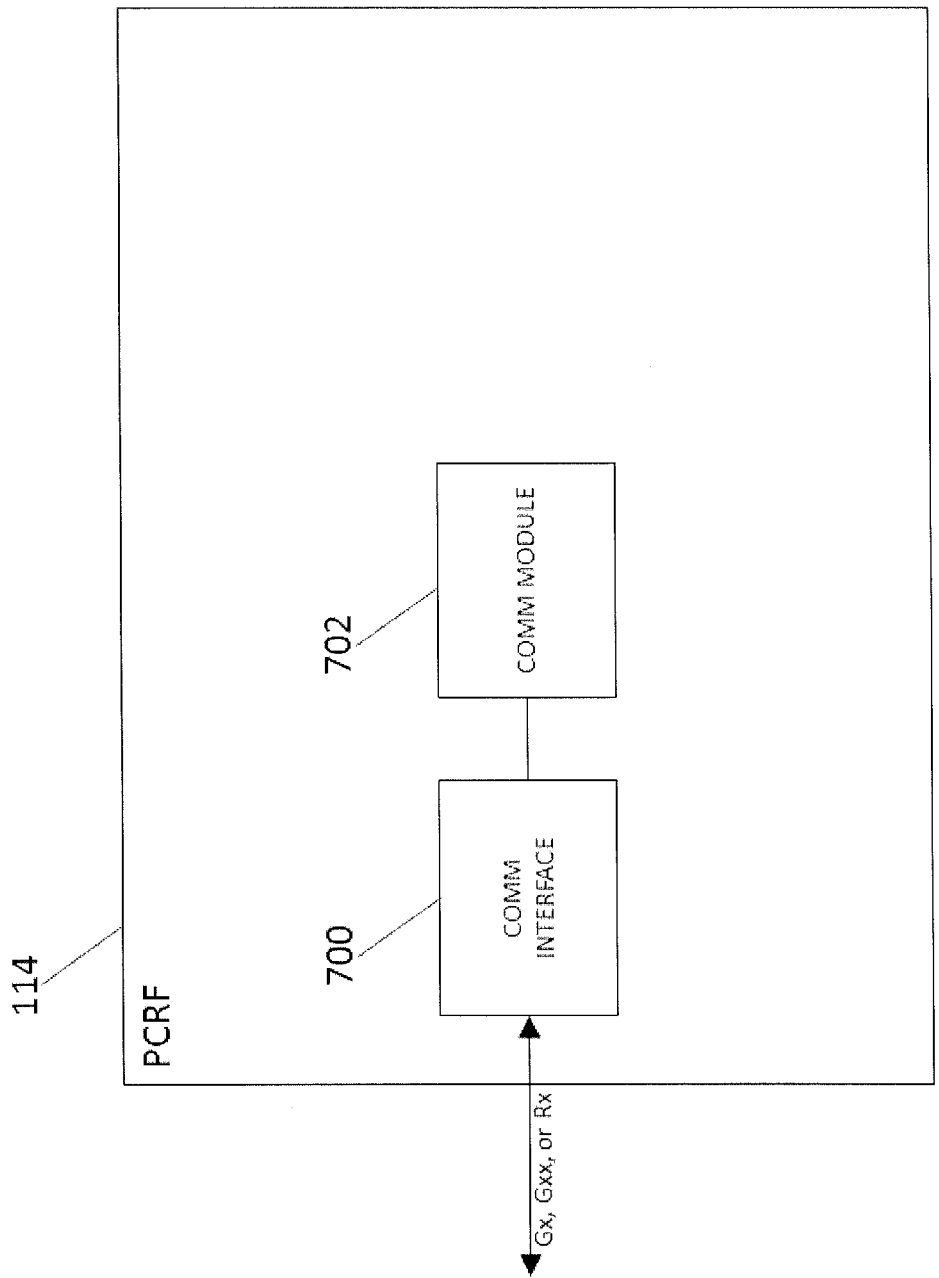
FIG. 7 is a block diagram of an exemplary PCRF node according to an embodiment of the subject matter described herein.

FIG. 7 is a block diagram of an exemplary PCRF node according to an embodiment of the subject matter described herein. Referring to FIG. 7, PCRF node 114 includes a communications interface 700 for sending and receiving messages. Communications interface 700 may be capable of communicating with other nodes via any suitable interface, such as a Gx interface, a Gxx interface, or an Rx interface. PCRF node 114 further includes a communications module 702 for communicating, via an Rx interface, a request to a DPI node to be notified when an SDF event occurs and receiving notification from the DPI node that the SDF event has occurred.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for communicating service data flow (SDF) event information, the method comprising:
   at a policy charging and rules function (PCRF) node:
      communicating, via an Rx interface, a request to a deep packet inspection (DPI) node to be notified when an SDF event occurs, wherein the DPI node is separate from a policy charging and enforcement function (PCEF) node;
      receiving notification from the DPI node that the SDF event has occurred; and
      in response to receiving notification from the DPI node that the SDF event has occurred, communicating a policy and charging rule to the PCEF node, wherein the policy and charging rule is sent via a Gx interface.

2. The method of claim 1 wherein the SDF event is the establishment of an Internet protocol (IP) connectivity access network (IPCAN) session.

3. The method of claim 1 wherein receiving notification from the DPI node that the SDF event has occurred is accomplished via the Rx interface.

4. The method of claim 1 wherein at least one of the request to the DPI node to be notified when the SDF event occurs and the notification from the DPI node that the SDF event has occurred is sent via a Diameter message, an extensible markup language (XML) message, a session initiation protocol (SIP) message, or a simple object access protocol (SOAP) message.

5. The method of claim 1 wherein the policy and charging rule is sent via a Diameter message, an extensible markup language (XML) message, a session initiation protocol (SIP) message, or a simple object access protocol (SOAP) message.

6. The method of claim 5 wherein the policy and charging rule is sent via a Diameter message and wherein the Diameter message comprises a credit control answer (CCA) message or a re-authorization-request (RAR) message.

7. The method of claim 1 comprising:
   in response to receiving notification from the DPI node that the SDF event has occurred, communicating to an application function (AF) node that the SDF event has occurred.

8. The method of claim 7 wherein communicating to the AF node that the SDF event has occurred is accomplished via the Rx interface.

9. The method of claim 7 wherein communicating to the AF node that the SDF event has occurred is accomplished via a Diameter message, an extensible markup language (XML) message, a session initiation protocol (SIP) message, or a simple object access protocol (SOAP) message.

10. The method of claim 7 wherein the communicating to the AF node is performed based on a request from the AF node.

11. A method for communicating service data flow (SDF) event information, the method comprising:
   communicating, by a policy charging and rules function (PCRF) node and to a deep packet inspection (DPI) node, a request that an application function (AF) node be notified when an SDF event occurs, wherein the communication is accomplished via an Rx interface, wherein the DPI node is separate from a policy charging and enforcement function (PCEF) node;
   in response to detecting the SDF event at the DPI node, sending, by the DPI node and to the AF node, notification that the SDF event has occurred; and
   receiving, at the AF node and from the DPI node, the notification that the SDF event has occurred.

12. The method of claim 11 wherein the SDF event is the establishment of an Internet protocol (IP) connectivity access network (IPCAN) session.

13. The method of claim 11 wherein sending the notification that the SDF event has occurred is accomplished via the Rx interface.

14. The method of claim 11 wherein at least one of the request that the AF node be notified when the SDF event occurs and the notification from the DPI node that the SDF event has occurred is sent via a Diameter message, an extensible markup language (XML) message, a session initiation protocol (SIP) message, or a simple object access protocol (SOAP) message.

15. A system for communicating service data flow (SDF) event information, the system comprising:
   a policy and charging rules function (PCRF) node; and a deep packet inspection (DPI) node, wherein the PCRF node is configured to:

communicate, via an Rx interface, a request to the DPI node to be notified when an SDF event occurs, wherein the DPI node is separate from a policy charging and enforcement function (PCEF) node;

receive notification from the DPI node that the SDF event has occurred, and in response to receiving notification from the DPI node that the SDF event has occurred, communicate a policy and charging rule to the PCEF node, wherein the policy and charging rule is sent via a Gx interface.

16. The system of claim 15 wherein the SDF event is the establishment of an Internet protocol (IP) connectivity access network (IPCAN) session.

17. The system of claim 15 wherein receiving notification from the DPI node that the SDF event has occurred is accomplished via the Rx interface.

18. The system of claim 15 wherein at least one of the request to the DPI node to be notified when the SDF event occurs and the notification from the DPI node that the SDF event has occurred is sent via a Diameter message, an extensible markup language (XML) message, a session initiation protocol (SIP) message, or a simple object access protocol (SOAP) message.

19. The system of claim 15 wherein the policy and charging rule is sent via a Diameter message, an extensible markup language (XML) message, a session initiation protocol (SIP) message, or a simple object access protocol (SOAP) message.

20. The system of claim 19 wherein the policy and charging rule is sent via a Diameter message and wherein the Diameter message comprises a credit control answer (CCA) message or a re-authorization-request (RAR) message.

21. The system of claim 15 wherein the PCRF node is configured to in response to receiving notification from the DPI node that the SDF event has occurred, communicate to an application function (AF) node that the SDF event has occurred.

22. The system of claim 21 wherein communicating to the AF node that the SDF event has occurred is accomplished via the Rx interface.

23. The system of claim 21 wherein communicating to the AF node that the SDF event has occurred is accomplished via a Diameter message, an extensible markup language (XML) message, a session initiation protocol (SIP) message, or a simple object access protocol (SOAP) message.

24. The system of claim 21 wherein the AF node requests, from the PCRF node, to be notified when the SDF event occurs and wherein the PCRF node communicates to the AF node that the SDF event has occurred based on the request.

25. A system for communicating service data flow (SDF) event information, the system comprising:

a policy charging and rules function (PCRF) node configured to communicate, via an Rx interface, a request that an application function (AF) node be notified of an SDF event; and a deep packet inspection (DPI) node configured to receive the request from the PCRF node via the Rx interface and to, in response to detecting the SDF event, send to the AF node notification that the SDF event has occurred, wherein the DPI node is separate from a policy charging and enforcement function (PCEF) node.

26. The system of claim 25 wherein the SDF event is the establishment of an Internet protocol (IP) connectivity access network (IPCAN) session.

27. The system of claim 25 wherein the DPI node is configured to send the notification that the SDF event has occurred via the Rx interface.

28. The system of claim 25 wherein at least one of the request that the AF node is to be notified when the SDF event occurs and the notification from the DPI node that the SDF event has occurred is sent via a Diameter message, an extensible markup language (XML) message, a session initiation protocol (SIP) message, or a simple object access protocol (SOAP) message.

29. A non-transitory computer readable medium comprising computer executable instructions that when executed by a processor of a computer control the computer to perform steps comprising:

communicating, via an Rx interface, a request to a deep packet inspection (DPI) node to be notified when an SDF event occurs, wherein the DPI node is separate from a policy charging and enforcement function (PCEF) node;

receiving notification from the DPI node that the SDF event has occurred, and in response to receiving notification from the DPI node that the SDF event has occurred, communicating a policy and charging rule to the PCEF node, wherein the policy and charging rule is sent via a Gx interface.

30. A non-transitory computer readable medium comprising computer executable instructions that when executed by a processor of a computer control the computer to perform steps comprising:

communicating, by a policy charging and rules function (PCRF) node and to a deep packet inspection (DPI) node, a request that an application function (AF) node be notified when an SDF event occurs, wherein the communication is accomplished via an Rx interface;

in response to detecting the SDF event at the DPI node, sending, by the DPI node and to the AF node, notification that the SDF event has occurred; and receiving, at the AF node and from the DPI node, the notification that the SDF event has occurred, wherein the DPI node is separate from a policy charging and enforcement function (PCEF) node.

\* \* \* \* \*